United States Patent
Robbin et al.

(10) Patent No.: US 9,555,974 B2
(45) Date of Patent: Jan. 31, 2017

(54) SURFACE TREATMENT PLANT FOR MOTOR VEHICLE BODIES

(75) Inventors: Joerg Robbin, Ammerbuch (DE); Thomas Hennig, Stuttgart (DE); Juergen Hanf, Tuebingen (DE)

(73) Assignee: EISENMANN AG, Boeblingen (DE)

( * ) Notice: Subject to any disclaimer, the term of this patent is extended or adjusted under 35 U.S.C. 154(b) by 239 days.

(21) Appl. No.: 13/821,878

(22) PCT Filed: Aug. 19, 2011

(86) PCT No.: PCT/EP2011/004177
§ 371 (c)(1),
(2), (4) Date: Jun. 4, 2013

(87) PCT Pub. No.: WO2012/031678
PCT Pub. Date: Mar. 15, 2012

(65) Prior Publication Data
US 2013/0319822 A1   Dec. 5, 2013

(30) Foreign Application Priority Data
Sep. 10, 2010   (DE) .................. 10 2010 045 014

(51) Int. Cl.
*B65G 47/00* (2006.01)
*B65G 35/06* (2006.01)
(Continued)

(52) U.S. Cl.
CPC ........... *B65G 35/06* (2013.01); *B05B 13/0264* (2013.01); *B62D 65/022* (2013.01); *B62D 65/18* (2013.01); *B05B 13/0452* (2013.01)

(58) Field of Classification Search
CPC . B65G 35/06; B05B 13/0264; B05B 13/0452; B62D 65/18
(Continued)

(56) References Cited

U.S. PATENT DOCUMENTS

| 5,115,758 A | 5/1992 | Suzuki et al. |
| 6,374,993 B1 * | 4/2002 | Tetzloff .................. B61B 10/02 198/465.4 |

(Continued)

FOREIGN PATENT DOCUMENTS

| DE | 102 00 982 A1 | 7/2003 |
| EP | 0 577 917 A1 | 1/1994 |

(Continued)

*Primary Examiner* — Gene Crawford
*Assistant Examiner* — Lester Rushin
(74) *Attorney, Agent, or Firm* — Factor Intellectual Property Law Group, Ltd.

(57) ABSTRACT

A surface treatment plant for vehicle bodies having a first treatment area which comprises a first conveyor system enabling a vehicle body to be conveyed through the first treatment area, and a second treatment area which includes a second conveyor system enabling the vehicle body to be conveyed through the second treatment area. A transfer device enables the vehicle body to be transferred from the first conveyor system to the second conveyor system. The transfer device includes supports which engage on regions of the vehicle body and at least one is arranged in particular on the highest point of the horizontal and the vehicle body is oriented roof upwards. Also a method for conveying vehicle bodies through a surface treatment plant.

15 Claims, 16 Drawing Sheets

(51) Int. Cl.
*B05B 13/02* (2006.01)
*B62D 65/18* (2006.01)
*B62D 65/02* (2006.01)
*B05B 13/04* (2006.01)

(58) Field of Classification Search
USPC .............................................. 198/602, 339.1
See application file for complete search history.

(56) References Cited

U.S. PATENT DOCUMENTS

| | | | |
|---|---|---|---|
| 7,461,733 | B2 | 12/2008 | Dohi |
| 8,469,651 | B2 * | 6/2013 | Nishihara .............. B62D 65/18 187/244 |
| 2001/0042672 | A1 * | 11/2001 | Di Rosa ..................... 198/345.3 |
| 2004/0037687 | A1 | 2/2004 | Weiss |
| 2009/0013524 | A1 * | 1/2009 | Kodo et al. ..................... 29/824 |

FOREIGN PATENT DOCUMENTS

| GB | 2 224 252 A | 5/1990 |
|---|---|---|
| GB | 2 439 903 A | 1/2008 |

* cited by examiner

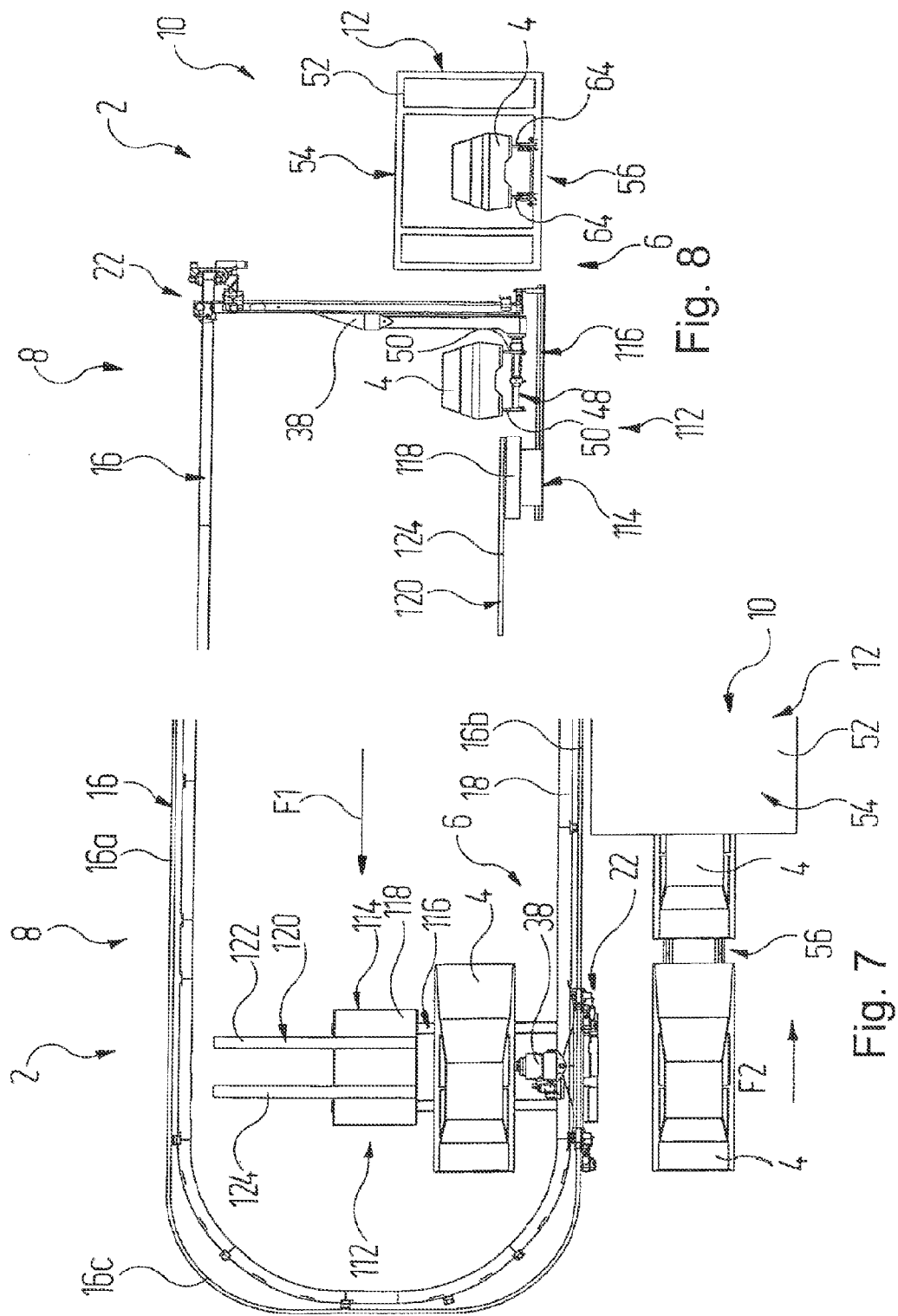

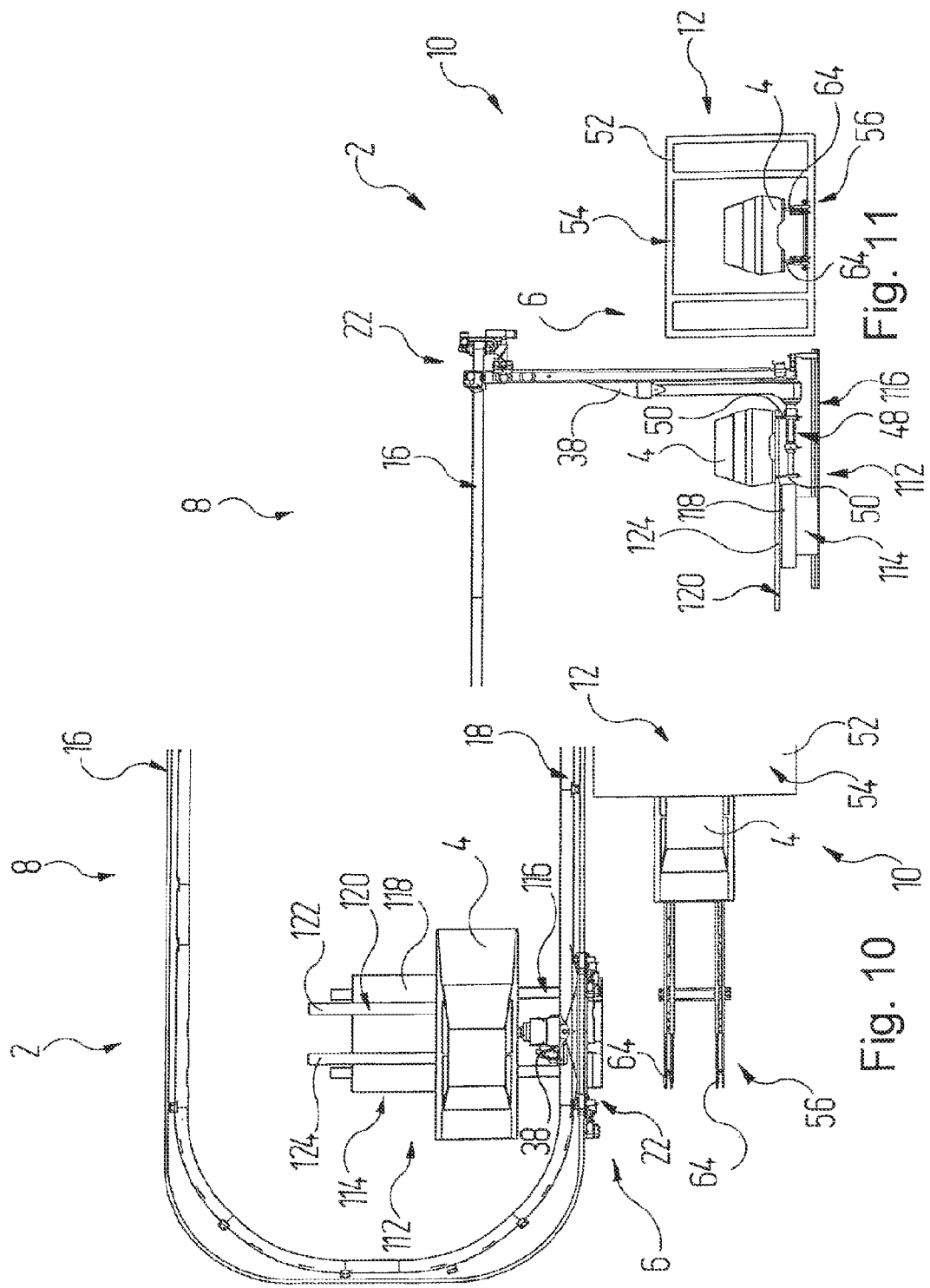

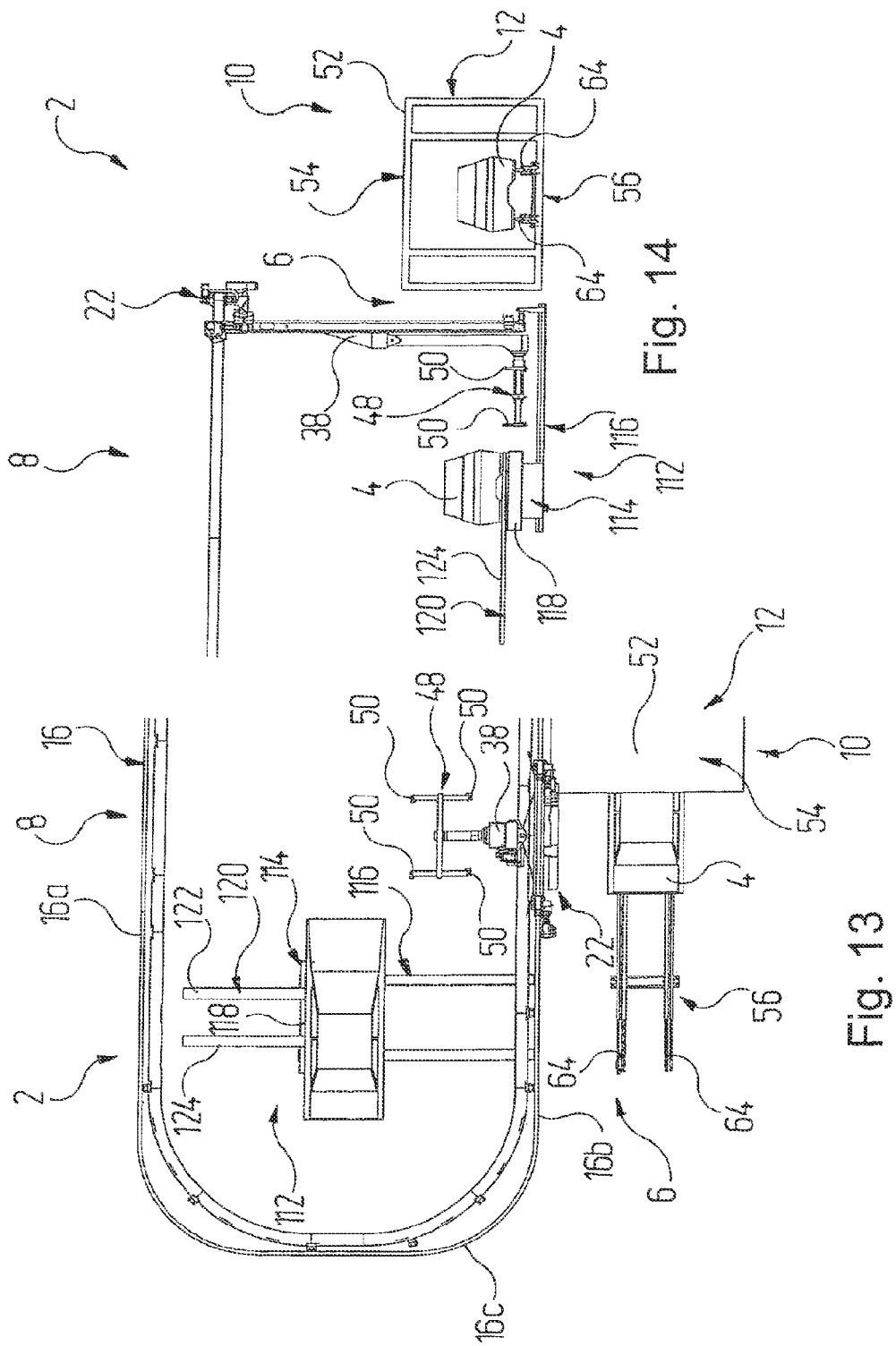

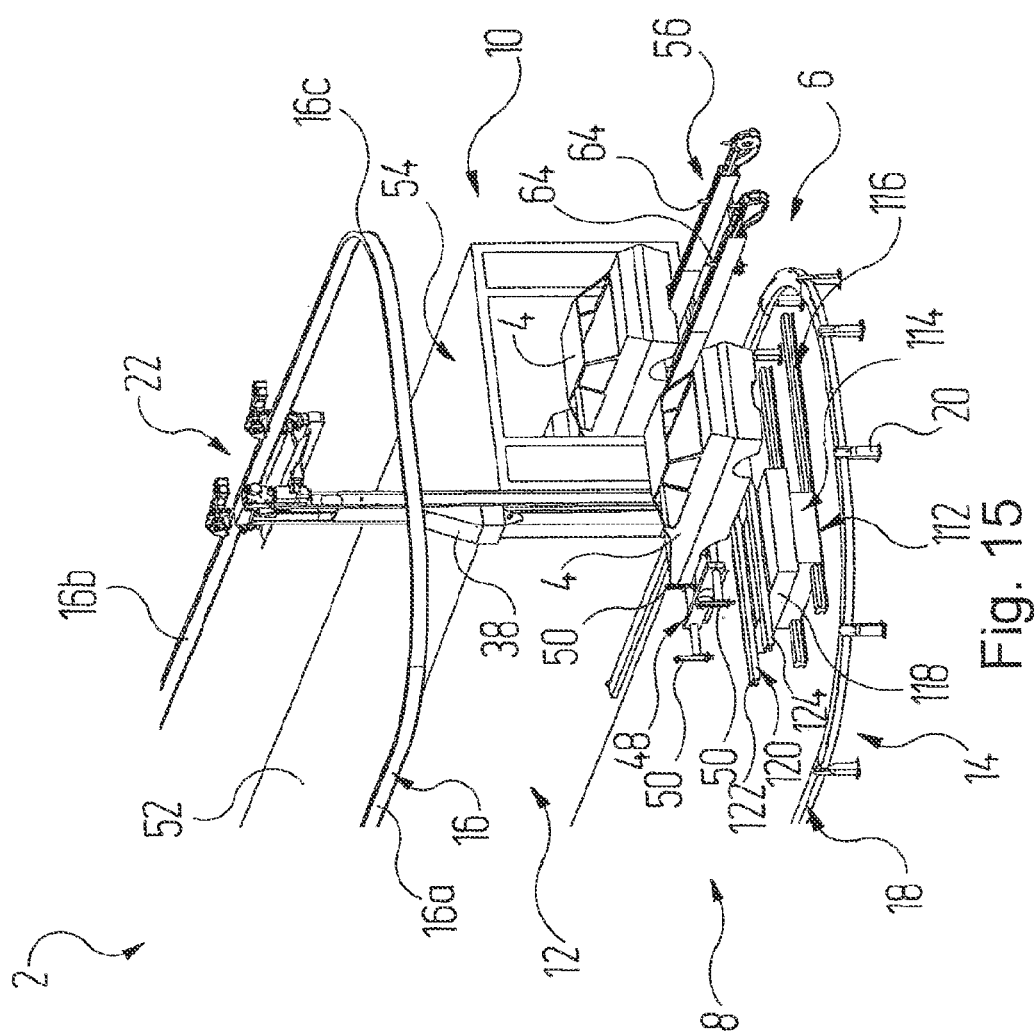

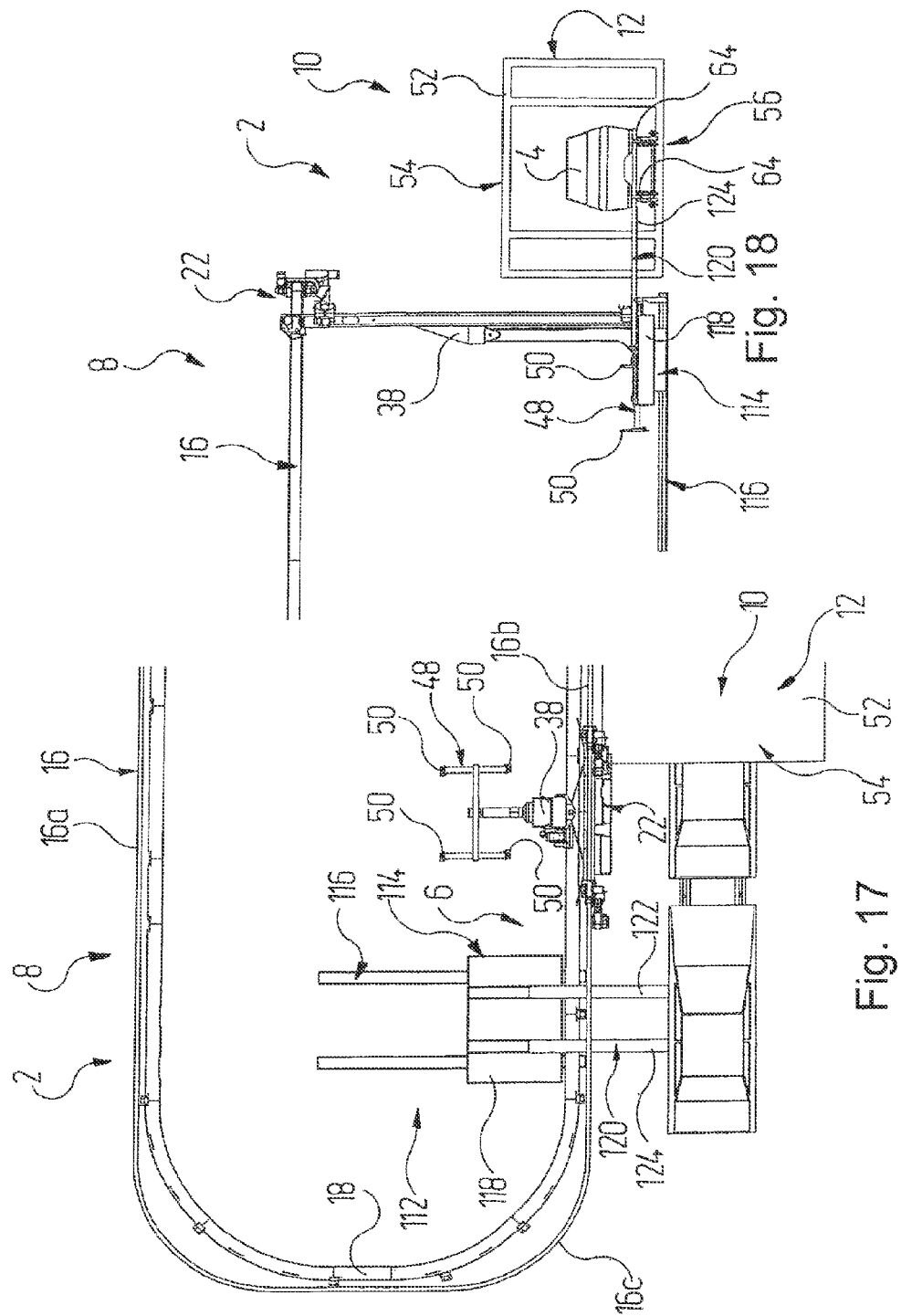

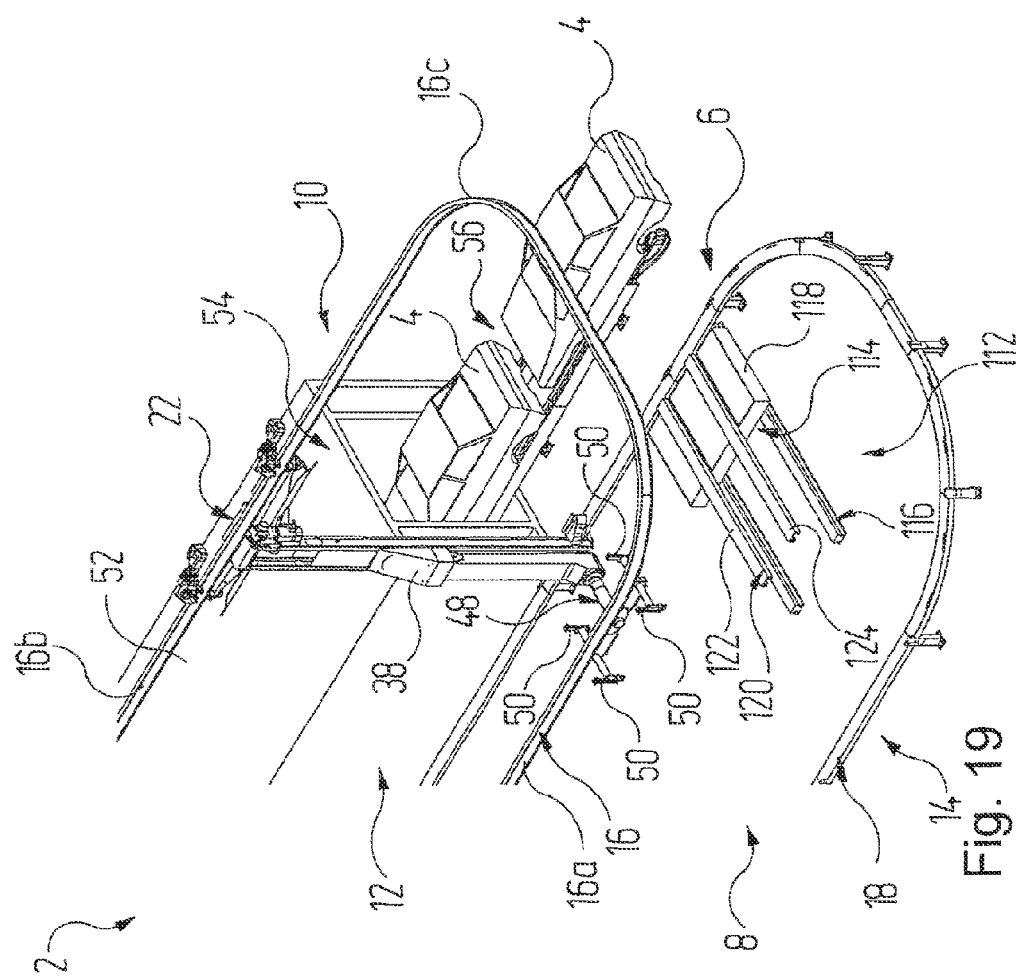

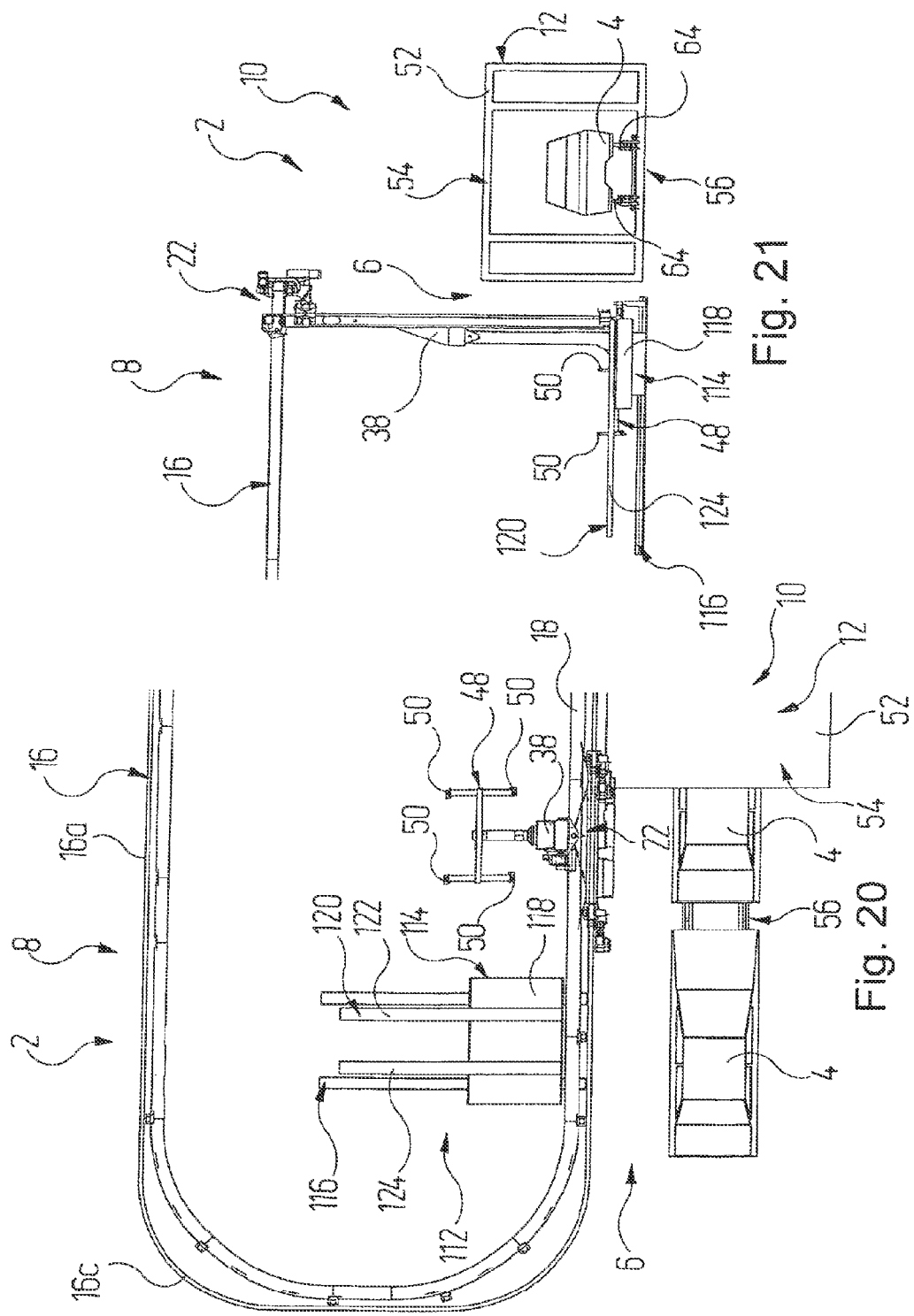

SURFACE TREATMENT PLANT FOR MOTOR VEHICLE BODIES

RELATED APPLICATIONS

This application claims the filing benefit of International Patent Application No. PCT/EP2011/004177, filed Aug. 19, 2011, which claims the filing benefit of German Patent Application No. 10 2010 045 014.6 filed Sep. 10, 2010, the contents of both of which are incorporated herein by reference.

TECHNICAL FIELD AND BACKGROUND OF THE INVENTION

The invention relates to a surface treatment plant for motor vehicle bodies, having
a) a first treatment area which comprises a first conveyor system by means of which a motor vehicle body can be conveyed through the first treatment area;
b) a second treatment area which comprises a second conveyor system by means of which the motor vehicle body can be conveyed through the second treatment area.

The invention relates in addition to a method for conveying motor vehicle bodies through a surface treatment plant, in which a motor vehicle body is conveyed by means of a first conveyor system through a first treatment area and by means of a second conveyor system through a second treatment area.

After construction of the shell, motor vehicle bodies are subjected to a surface treatment, which comprises in total a relatively large number of individual treatment steps. Consequently, a surface treatment plant for motor vehicle bodies comprises many different treatment areas, through which the motor vehicle bodies that are to be treated must pass in a fixed order.

In surface treatment plants known on the market, the motor vehicle bodies are conveyed into different treatment areas by means of different conveyor systems that are adapted to the particular treatment in question.

A treatment area can also comprise a plurality of treatment regions in which different types of treatment can be carried out, but the conveyor system does not change. As long as the motor vehicle bodies are conveyed through successive treatment regions by means of one and the same conveyor system, those treatment regions belong to one treatment area.

A surface treatment plant for motor vehicle bodies comprises, for example, the following treatment areas TA, which may be divided into treatment regions denoted TR and between which a transfer region is arranged in each case:

| | | |
|---|---|---|
| TA-1 | TR-1 | Pretreatment (one or more dip tanks) |
| | TR-2 | Cataphoretic dip coating (CDC) |
| Transfer region | | |
| TA-2 | | CDC drier |
| Transfer region | | |
| TA-3 | TR-1 | CDC audit |
| | TR-2 | CDC polishing |
| | TR-3 | Seam sealing |
| Transfer region | | |
| TA-4 | | Undercoating |
| Transfer region | | |
| TA-5 | | Filler |
| Transfer region | | |
| TA-6 | | Filler drier |
| Transfer region | | |
| TA-7 | TR-1 | Filler audit |
| | TR-2 | Filler polishing |
| Transfer region | | |
| TA-8 | | Top coat |
| Transfer region | | |
| TA-9 | | Top coat drier |
| Transfer region | | |
| TA-1 | TR-1 | Top coat audit |
| | TR-2 | Spot repair |
| | TR-3 | Cavity sealing |

In a transfer region, the motor vehicle body is transferred from the conveyor system of a first treatment area to the conveyor system, which is different therefrom, of a subsequent, second treatment area.

In surface treatment plants known on the market, the motor vehicle bodies are secured to so-called skids and conveyed through the individual treatment areas. The skid with the motor vehicle body is normally transferred from a first conveyor system to a second conveyor system, which conveyor systems both cooperate with the skid but are structurally different, because different treatment areas mostly also require different conveyor systems. Examples which may be mentioned are an electrified monorail system for dipping treatment and a chain conveyor for a drying operation.

In the individual treatment areas, such a skid in most cases undergoes the same treatment as the motor vehicle body secured thereto. Accordingly, in the first treatment area designated TA-1 above, for example, a skid is guided together with the motor vehicle body through the dip tanks that are present. Some of the treatment liquid is accordingly also used for the skids.

The motor vehicle body also traverses the subsequent CDC drier in treatment area TA-2 on a skid. Accordingly, with each motor vehicle body, the associated skid is also heated up each time and is subsequently allowed to cool down again with the motor vehicle body. As a result, a considerable amount of energy is used in each drying operation for heating the skid.

In treatment areas in which the skid does not undergo any direct material treatment, it must nevertheless be carried together with the motor vehicle body. The total mass of the motor vehicle body and the skid that is to be conveyed is accordingly considerably higher than the mass of a motor vehicle body alone. For example, a motor vehicle body weighing approximately 400 kg is conveyed on a skid that weighs approximately 150 kg. Because greater masses have to be moved, more energy must also be utilised for transporting the motor vehicle body and the skid than for transporting a motor vehicle body on its own.

Overall, in the case of the conventional techniques of conveying motor vehicle bodies with a skid, the overall energy balance in respect of the motor vehicle bodies that are to be treated is impaired and the overall operating costs of the plant are accordingly increased.

Accordingly, it is an object of the invention to provide a plant and a method of the type mentioned at the beginning which take that idea into account.

SUMMARY OF THE INVENTION

The object may be achieved in a plant of the type mentioned at the beginning in that
c) there is present a transfer device by means of which the motor vehicle body can be transferred from the first conveyor system to the second conveyor system;

d) the transfer device comprises carrier means which engage with regions of the motor vehicle body, of which in particular at least one is arranged at the lowermost point of the motor vehicle body, which is oriented horizontally and roof upwards.

According to the invention, the transfer device directly engages a motor vehicle body that is to be transferred and opens up the possibility of equipping successive treatment areas with conveyor systems that work differently in respect of the way in which they receive the body. Accordingly, the motor vehicle bodies can pass through a drier, for example, on narrower skids with a lower energy uptake or even without skids. At least in individual treatment areas or regions thereof, it is possible to dispense with conveyor skids.

If the first conveyor system operates with skids but the second conveyor system is able to move the motor vehicle body without a skid, a motor vehicle body can be removed from the skid by the transfer device and fed to the second conveyor system.

If, on the other hand, the first conveyor system works without skids but the second conveyor system is to convey the motor vehicle body with skids, a motor vehicle body from the first treatment area can be received by the transfer device and transferred to a skid of the second conveyor system.

Accordingly, it is advantageous if the first conveyor system and/or the second conveyor system are so configured that they convey the motor vehicle body without a separate carrier structure for the motor vehicle body. The greatest advantage is achieved, however, if both the first conveyor system and the second conveyor system convey the motor vehicle body without a separate carrier structure for the motor vehicle body. Conveying through the first treatment area and the second treatment area then takes place overall without a skid. In the best case, this is ensured for all the conveyor systems of all the successive treatment areas of the plant.

Current motor vehicle bodies are already manufactured with coupling components which are adapted to skid technology. These coupling components of the motor vehicle bodies cooperate with correspondingly adapted locking elements on the skids, which locking elements are known per se and by way of which a motor vehicle body is secured to a skid.

If the first and/or the second conveyor system conveys without a separate carrier structure, in particular without a skid, it is particularly advantageous if the first conveyor system and/or the second conveyor system comprise coupling elements which cooperate with coupling components of the motor vehicle body. The coupling means already present on the motor vehicle body can thus be used.

It has been found to be advantageous in practice if the carrier means of the transfer device are so configured that they cooperate with bottom regions of the motor vehicle body, which is oriented roof upwards, that are not used by the first conveyor system or by the second conveyor system. In this manner, the first and second conveyor systems can use the same coupling regions or coupling components, and corresponding components of the conveyor systems can be manufactured to be identical or structurally similar.

Secure conveying of the motor vehicle bodies is ensured when the transfer device comprises a carrier rail system and a carriage which runs thereon and carries the carrier means for the motor vehicle body.

If the vertical position of the carrier means is adjustable, a motor vehicle body can advantageously be lifted from the first conveyor system, for example, by means of the transfer device and lowered onto the second conveyor system.

The carrier rail system of the transfer device can be in the form of a roller conveyor, for example, and the carriage can comprise a running gear complementary thereto.

In that case it can be advantageous if the roller conveyor is arranged at a distance from the floor and the running gear is coupled to a suspended conveyor which in turn comprises the carrier means for the motor vehicle body.

With regard to the above-mentioned possibility of adjusting the vertical position of the carrier means, it is advantageous in that case if at least a section of the roller conveyor is displaceable by means of a lifting/lowering device between an upper working position and a lower working position.

Alternatively, the carrier rail system of the transfer device can be a floor-mounted rail system and the carriage can be a sliding carrier which runs thereon.

The sliding carrier then preferably carries a lifting/lowering device by means of which the vertical position of the carrier means is adjustable.

It is additionally advantageous if the horizontal position of the carrier means relative to the sliding carrier is adjustable.

If the carrier means is in the form of a fork element having at least two carrier prongs, the transfer device can work according to the principle of a forklift truck.

The above-mentioned object may be achieved in the case of the method of the type mentioned at the beginning in that
the motor vehicle body is transferred by a transfer device from the first conveyor system to the second conveyor system;
wherein carrier means of the transfer device engage with regions of the motor vehicle body, of which in particular at least one is arranged at the lowermost point of the motor vehicle body, which is oriented horizontally and roof upwards.

The advantages correspond to the advantages discussed above in relation to the plant.

Accordingly, it is advantageous if the motor vehicle body is conveyed by means of the first conveyor system and/or by means of the second conveyor system without a separate carrier structure for the motor vehicle body.

It is likewise advantageous, for the reasons mentioned above in the same context, if the carrier means of the transfer device engage with bottom regions of the motor vehicle body, which is oriented roof upwards, that are not used by the first conveyor system or by the second conveyor system.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention will be discussed in greater detail hereinbelow with reference to the drawings, in which:

FIGS. 6 to 21 show as a second exemplary embodiment a transfer region of the surface treatment plant for motor vehicle bodies between two treatment areas, wherein six phases of the transfer of a motor vehicle body from one treatment area to the other treatment area by a transfer device of a second type are shown.

DETAILED DESCRIPTION OF THE PRESENT INVENTION

Figure 1:
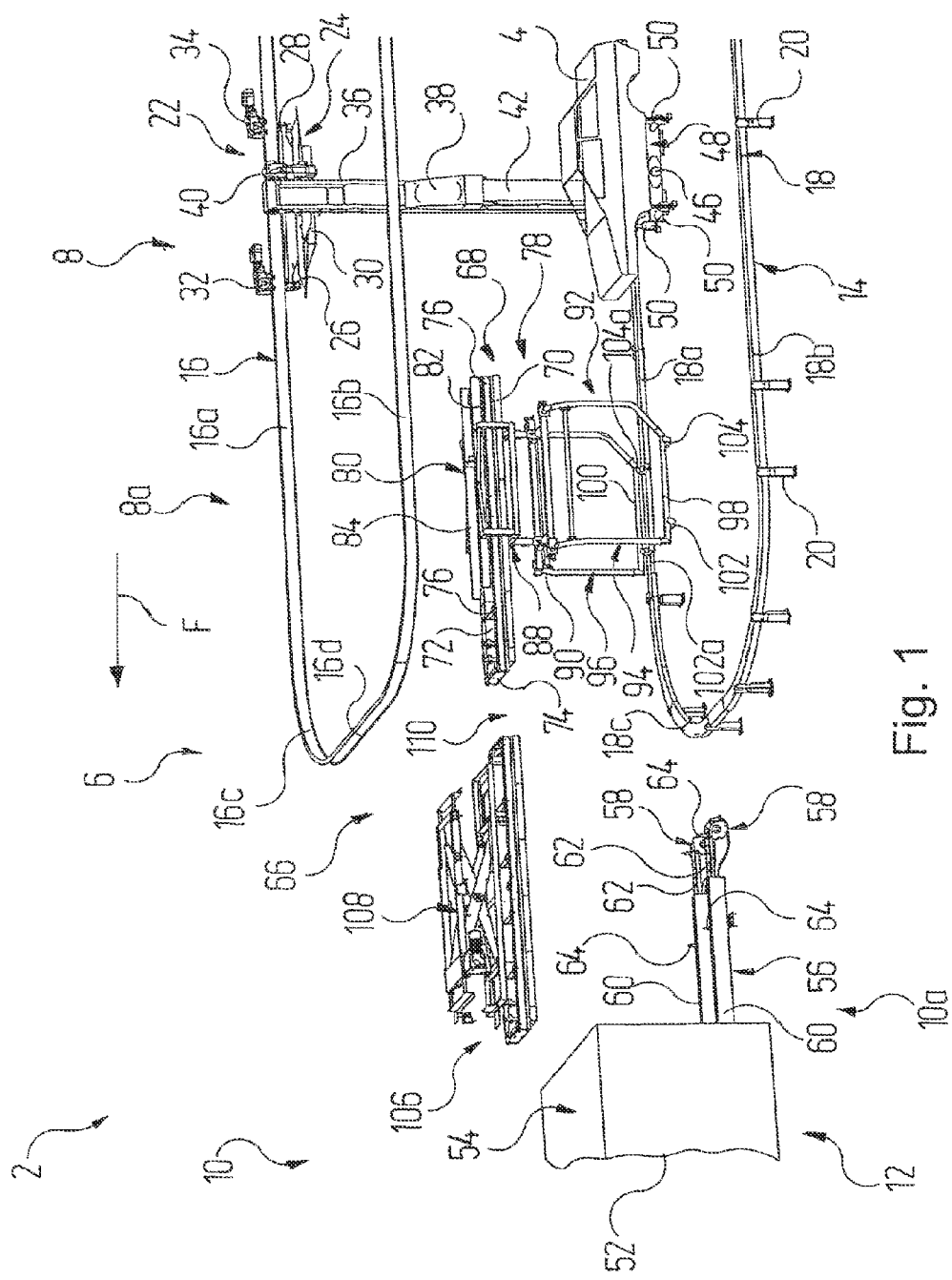
FIGS. 1 to 5 show as a first exemplary embodiment a transfer region of a surface treatment plant for motor vehicle bodies between two treatment areas, in each case in a perspective view, wherein five phases of the transfer of a motor vehicle body from one treatment area to the other treatment area by a transfer device of a first type are shown.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the first exemplary embodiment shown in FIGS. 1 to 5, 2 denotes generally a surface treatment plant for motor vehicle bodies 4, of which only a transfer region 6 between a first treatment area 8 and a second treatment area 10 is shown.

The first treatment area 8 is a dip treatment area and in the exemplary embodiment shown here comprises a pretreatment region and a region for cataphoretic dip coating, the dip tanks of which are, however, not shown. The dip treatment area 8 accordingly corresponds to treatment area TA1 discussed at the beginning. Details of a corresponding pretreatment and cataphoretic dip coating are generally known and are not discussed in greater detail here. In FIGS. 1 to 5, only a discharge region 8a of the dip treatment area 8 is shown, to which a motor vehicle body 4 passes after it has traversed the corresponding dip tanks.

The second treatment area 10 is a drying area, of which only an entry region 10a is shown in FIGS. 1 to 5. The drying area 10 accordingly corresponds to treatment area TA2 described at the beginning and comprises a drier 12, which will be discussed further hereinbelow.

The motor vehicle bodies 4 are conveyed by means of a first conveyor system 14 through the first treatment area 8 and thereby through the dip tanks thereof. In the present exemplary embodiment, the conveyor system 14 is an overhead conveyor of the electrified overhead monorail type and comprises a load-bearing drive rail 16 having an I-shaped profile, as is also used in conventional electrified overhead monorails. The drive rail 16 is attached to a cover structure (not shown). Of the drive rail 16 there can be seen in FIGS. 1 to 5 two straight sections 16a, 16b which extend opposite and parallel to one another and which are connected together by a connecting section 16c, which in turn comprises two curved sections and a straight section extending between them. The latter is denoted 16d only in FIG. 1. Beneath the drive rail 16 there runs parallel thereto a guide rail 18 having corresponding sections 18a, 18b, 18c, which guide rail 18 is fastened to bearing supports 20 and forms a U-shaped profile that is open to the bottom.

The first conveyor system 14 further comprises a plurality of transport carriages 22, of which only one is shown in each of FIGS. 1 to 5. The transport carriage 22 comprises a drive carriage 24, which runs on the drive rail 16. The drive carriage 24 is in principle a structure which is known from conventional electrified overhead monorails. The drive carriage 24 has two running gears 26, 28, which are connected together by way of a connecting frame 30. The connecting frame 30 carries in a known manner control components, which are able to communicate with a central control system. In this manner, largely independent movement of the different transport carriages 22 is possible.

The running gears 26 and 28 are equipped in a known manner with guide and carrier rollers, which are not provided with a reference numeral here and roll on different surfaces of the I-shaped profile of the drive rail 16. In each case at least one of the rollers of the running gears 26, 28 serves as a drive roller and for that purpose can be rotated by an electric motor 32 or 34.

The connecting frame 30 carries a carrier and guide profile 36 for a slide 38, which carrier and guide profile 36 extends vertically downwards. The profile 36 carries at its lower end remote from the drive carriage 24 a guide roller (not shown), which rolls in the U-shaped profile of the guide rail 18. The carrier and guide profile 36 is thereby guided securely in its vertical orientation, and tilting of the carrier and guide profile 36 from the vertical is prevented.

The slide 38 is displaceably mounted in the carrier and guide profile 36 and can be displaced upwards and downwards along the profile 36 by means of a servomotor 40 and associated drive components, as are known per se.

The slide 38 carries a connecting profile 42, which projects vertically downwards from the slide 38 and parallel to the carrier and guide profile 36. On the end 44 of the connecting profile 42 that is remote from the slide 38 there is mounted a pivot pin 46, which defines a horizontal axis of rotation. The pivot pin 46 can be rotated in a manner known per se in both directions of rotation about the horizontal axis of rotation by way of a gear motor (not shown) which is carried by the slide 38 and communicates with the above-mentioned control components of the transport carriage 22.

The pivot pin 46 is in turn rigidly connected to a carrier unit 48 for the motor vehicle body 4, so that the carrier unit 48 follows every rotary movement of the pivot pin 46. When the carrier unit 48 is oriented horizontally, the slide 38, the connecting profile 42 and the carrier unit 48 together form a type of L-shaped bracket, the short limb of which is given by the pivot pin 46 and the carrier unit 48.

The carrier unit 48 comprises a securing device in the form of four locking pins 50, which serve as coupling elements and each of which has a chuck cone. The latter cooperates with an associated coupling component of the motor vehicle body, which to that end has an engagement opening for the chuck cone. Such locking pins are conventionally provided on a conveyor skid for motor vehicle bodies. The mode of operation of such locking pins in conjunction with a motor vehicle body is known from the prior art, so that more detailed explanations thereof are not necessary here.

When a motor vehicle body 4 is secured to the carrier unit 48 by way of the locking pins 50, the carrier unit 48 can be rotated through any angle, the motor vehicle body 4 always remaining securely connected to the carrier unit 48. In this manner, the motor vehicle body 4 can even be transported roof downwards, rotated through 180° relative to the normal position. The motor vehicle body 4 is in any case conveyed without a skid by means of the overhead conveyor 14.

In the process sequence of the surface treatment of the motor vehicle body 4, the dip treatment area 8 is followed by the already mentioned drying area 10 with the drier 12. The drier 12 comprises a drier housing 52, which delimits a drying tunnel. At the entry region 10a of the drier 12, which is visible in FIGS. 1 to 5, an entrance gate 54 is provided. At the opposite, discharge end, which is not shown in FIGS. 1 to 5, an exit gate is provided in a corresponding manner.

Motor vehicle bodies 4 are conveyed continuously through the drier housing 52 by means of a second conveyor system 56.

To that end, the second conveyor system 56 in the present exemplary embodiment is in the form of a chain conveyor and comprises two substantially identical endless chains 58 which circulate next to one another and in parallel and are each guided by a guide profile 60. The two endless chains 58 thus each provide an upper conveyor run 62. Each endless chain 58 carries support pins 64 as coupling elements, which support pins 64 project vertically upwards from the conveyor run 62 and are moved with the endless chain 58 as it revolves. In FIGS. 1 to 5, only the entry region of the chain conveyor 56 before its entry into the drier housing 52 can be seen.

The support pins 64 are matched in terms of their dimensions and their arrangement on the endless chains 58 to the vehicle bodies 4 that are to be treated, so that they are able to cooperate with the coupling components thereof, which are also configured for the locking pins 50 of the first conveyor system 14. The arrangement of in each case four support pins 64, of which in each case two are carried by one endless chain 58, accordingly corresponds to the arrangement of the four locking pins 50 of the carrier unit 48 of the first conveyor system 14.

Unlike the locking pins 50, however, the support pins 64 of the endless chains 58 serve merely as support points, without the motor vehicle body 4 having to be fixedly connected to the endless chain 58 in question. However, the chain conveyor 56 also conveys the motor vehicle bodies 4 without a skid.

The drier 12 with its chain conveyor 56 is so arranged that the motor vehicle body 4 is conveyed by the chain conveyor 56 in the same conveying direction and also without a lateral offset, as is the case in the region of the straight section 16*a* of the drive rail 16 of the overhead conveyor 14. This conveying direction is indicated by an arrow F.

Because the locking pins 50 of the overhead conveyor 14 and the support pins 64 of the chain conveyor 56 cooperate with the same coupling means of the motor vehicle bodies 4, it is not possible for the motor vehicle body 4 to be transferred directly from the overhead conveyor 14 to the chain conveyor 56. In order to transfer a motor vehicle body 4 that is to be treated from the first conveyor system 14 of the dip treatment area 8 to the second conveyor system 56 of the drying zone 10, a transfer device 66 is therefore present in the transfer region 6.

Figure 2:
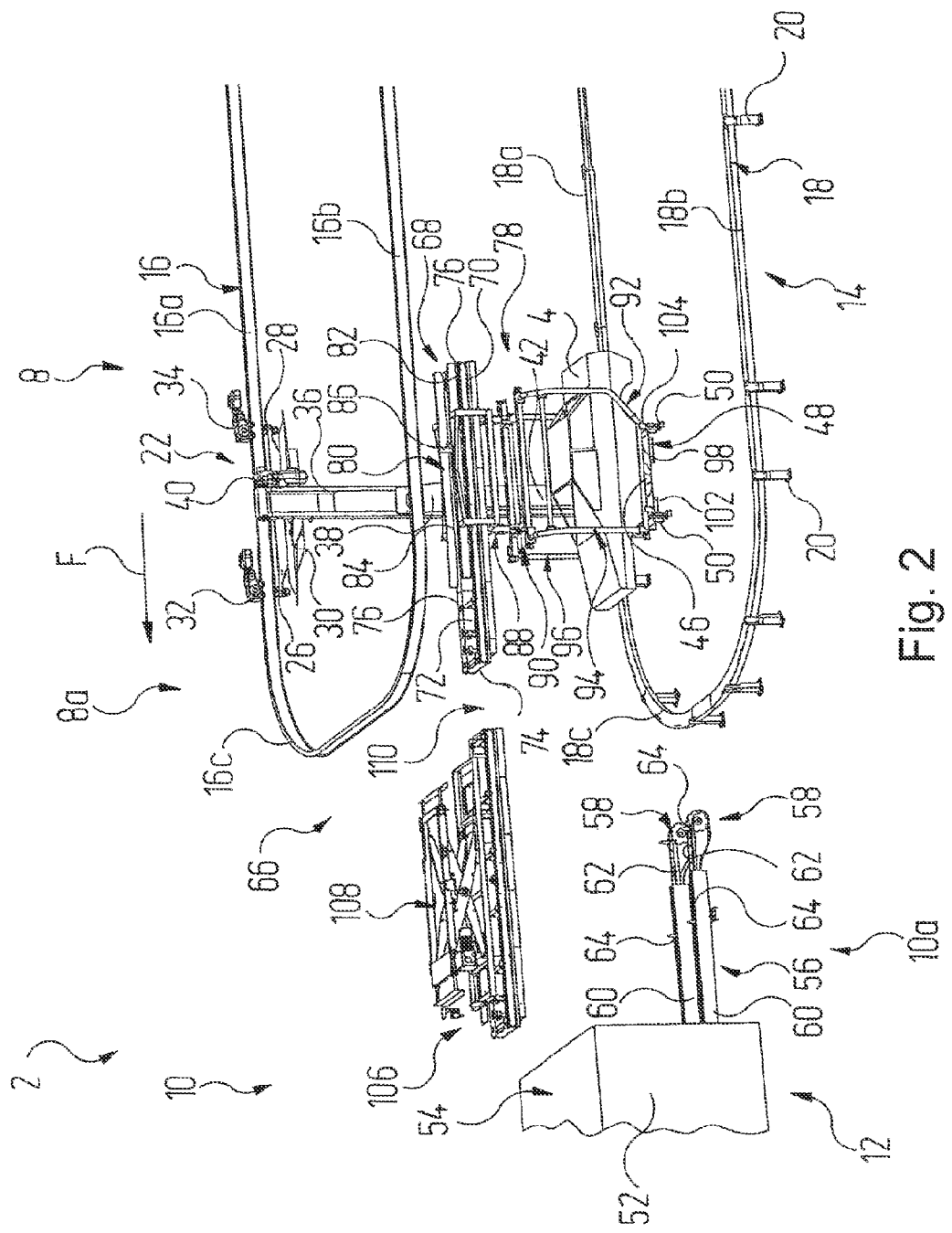

In the present exemplary embodiment, the transfer device 66 comprises a first roller conveyor 68 having two load-bearing roller bars 70, 72 which extend horizontally and parallel to one another and which are connected together at their ends by way of transverse members 74. The roller bars 70, 72 extend horizontally. The first roller conveyor 68 is arranged at a distance from the floor over a cover structure (not shown) vertically between the drive rail 16 and the guide rail 18 of the overhead conveyor 14 in the region of its straight section 16*a* of the drive rail 16. The roller conveyor 68 is secured in a stationary manner and is arranged offset slightly inwards relative to the section 16*a* of the drive rail 16 in the direction towards the parallel section 16*b* of the drive rail 16, so that the carrier and guide profile 36 with the slide 38 and its connecting profile 42 to the carrier unit 48 can be guided at the side past the roller conveyor 68, the carrier unit 48 remaining beneath the roller conveyor 68, as can be seen in FIG. 2.

Each roller bar 70, 72 has a plurality of rollers 76, not all of which are provided with a reference numeral. The rollers 76 are located opposite one another in pairs and are each mounted for rotation about a horizontal axis of rotation, which axes of rotation extend perpendicular longitudinal extent of the roller bars 70, 72 and accordingly perpendicular to the conveying direction F.

At least one roller 76 of an opposing pair of rollers is driven. This can be effected, for example, by means of an electric hub drive arranged on the inside of the roller 76 that is driven. It is also possible for a plurality or all of the rollers 76 to be driven.

On the rollers 76 there runs a carriage 78 with a running gear 80, which to that end comprises two parallel runner-like running bars 82, 84 which are connected together by way of transverse beams 86 and rest on the rollers 76 of the roller conveyor 68. For the lateral guiding of the running bars 82, 84, the rollers 76 of the roller bars 70, 72 have lateral rims, which are not designated separately here.

The running bars 84, 86 are each connected laterally to a carrier structure 88 of the running gear 80, which engages around the sides of the roller bars 70, 72 of the roller conveyor 68. Beneath the roller bars 70, 72 of the roller conveyor 68, the carrier structure 88 is coupled with a horizontal carrier frame 90 of a suspended conveyor 92, which in turn carries a receiving frame 94 or 96 on the right and left in the conveying direction F. The receiving frames 94, 96 are at such a distance from one another that they can receive a motor vehicle body 4 between them.

At its lower end remote from the running gear 80 of the carriage 78, each receiving frame 94, 96 has a carrier beam 98 or 100, which extends horizontally and parallel to the conveying direction F. Two inwardly projecting carrier brackets 102 and 104 are mounted on each carrier beam 98, 100.

The carrier brackets 102 and 104 each provide a support surface 102*a* and 104*a*, on which a motor vehicle body 4 can be supported in the region of its bottom longitudinal beams. Conventionally, in a motor vehicle body, there is a sheet metal border in the region of its bottom longitudinal beams; that sheet metal border can be used, for example, as the bearing region of the motor vehicle body 4, on which the carrier brackets 102, 104 are able to engage. In particular, such a sheet metal border provides one or more lowermost points of a motor vehicle body 4 when it is oriented roof upwards in its horizontal normal position.

In addition, however, the carrier brackets 102, 104 may also cooperate with any other suitable region on the bottom of the motor vehicle body 4, apart from the mentioned coupling components for the locking pins 50 of the overhead conveyor 14 or support pins 64 of the chain conveyor 56.

In addition to the stationary roller conveyor 68, the transfer device 66 comprises a roller conveyor 106 which is displaceable in the vertical direction. This is identical with the stationary roller conveyor 68 in terms of construction so that, for reasons of clarity, corresponding components of the displaceable roller conveyor 106 are not provided with their own reference numeral.

The displaceable roller conveyor 106 forms with the stationary roller conveyor a carrier rail system for the carriage 78. The displaceable roller conveyor 106 is arranged next to the stationary roller conveyor 68 in the direction towards the drier 12 and extends in the same longitudinal direction as the stationary roller conveyor 68.

On its upper side, the displaceable roller conveyor 106 is coupled with a lifting/lowering device 108 in the manner of a scissor lift, which in turn is secured to a cover structure (not shown). The lifting/lowering device 108 is configured according to conventional structural features, so that a more detailed explanation thereof is not required.

The displaceable roller conveyor 106 is arranged above the entry region of the chain conveyor 56 and can be moved by means of the lifting/lowering device 108 between an upper working position and a lower working position. In the upper working position shown in FIGS. 1 to 4, the displaceable roller conveyor 106 is arranged at the same level as the stationary roller conveyor 68. In the upper working position, the displaceable roller conveyor 106 accordingly forms a continuation of the stationary roller conveyor 68.

Between the two opposing ends of the roller conveyors 68 and 106 there remains a gap 110, which is arranged in the region beneath the straight section 16d of the connecting section 16c of the drive rail 16 of the overhead conveyor 14. The size of the gap 110 is such that the transport carriage 22 of the overhead conveyor 14 can be moved from the section 16a of the drive rail 16 over the connecting section 16c to section 16b thereof, it being possible for the carrier and guide profile 36 of the transport carriage 22 to be guided between the opposing ends of the two roller conveyors 68 and 106 without a collision.

The transfer of a motor vehicle body 4 from the overhead conveyor 14 of the dip treatment area 8 to the chain conveyor 56 of the drying area 10 is carried out as follows:

FIG. 1 shows a starting situation in which a motor vehicle body 4 is fixedly secured by means of the locking pins 50 to the carrier unit 48 of the transport carriage 22 of the overhead conveyor 14. The motor vehicle body 4 has undergone the above-mentioned pretreatment and cataphoretic dip coating and is now to be fed in the conveying direction F to the drier 12 and to that end transferred to the chain conveyor 56 thereof.

The carriage 78 of the transfer device 66 is located in the region of the stationary roller conveyor 68 and rests with its running bars 82, 84 on the rollers 76 thereof.

The slide 38 of the transport carriage 22 is displaced by means of the servomotor 40 into a vertical position in which the carrier unit 48 with the motor vehicle body 4 is arranged at a level above the support surfaces 102a, 104a of the carrier brackets 102, 104 of the suspended conveyor 92 of the transfer device 66.

The transport carriage 22 is then moved in the conveying direction F until the motor vehicle body 4 is located between the receiving frames 94, 96 of the carriage 78 of the transfer device 66. The motor vehicle body 4 is so positioned in the conveying direction F that the carrier brackets 102 and 104 are located beneath their respective associated bottom regions of the motor vehicle body, which have been discussed above.

The slide 38 of the transport carriage 22 is then displaced downwards until the motor vehicle body 4 is seated with its bottom regions, which are suitable for that purpose and have been discussed above, on the support surfaces 102a, 104a of the carrier brackets 102, 104 of the suspended conveyor 92. This phase is shown in FIG. 2. It can be seen therein that at least the carrier brackets 104 that are at the back in the conveying direction F are then positioned, in a direction perpendicular to the conveying direction F, at the side next to the locking pins 50 that are at the back in the conveying direction F. The bottom regions of the motor vehicle body 4 which cooperate with the carrier brackets 104 accordingly flank the coupling components of the motor vehicle body 4 that are intended for the locking pins 50 of the overhead conveyor 14 and the support pins 64 of the chain conveyor 56.

In any case, the carrier brackets 102, 104 engage with and cooperate with bottom regions of the motor vehicle body 4, which is oriented roof upwards, that are not used by the first conveyor system in the form of the overhead conveyor 14 or by the second conveyor system in the form of the chain conveyor 56. In the present case, those bottom regions are present on the sill of the motor vehicle body 4.

The coupling components of the motor vehicle body 4 for the locking pins 50 of the overhead conveyor 14 or for the support pins 64 of the chain conveyor 56 are accordingly arranged offset inwardly in the longitudinal direction relative to the sills of the motor vehicle body 4, relative to the mid-plane thereof, as is conventionally the case.

The locking pins 50 of the carrier unit 48 are then released and the slide 38 of the transport carriage 22 is moved downwards slightly so that the carrier unit 48 frees the motor vehicle body 4, which is then carried completely by the carriage 78 of the transfer device 66.

Figure 3:
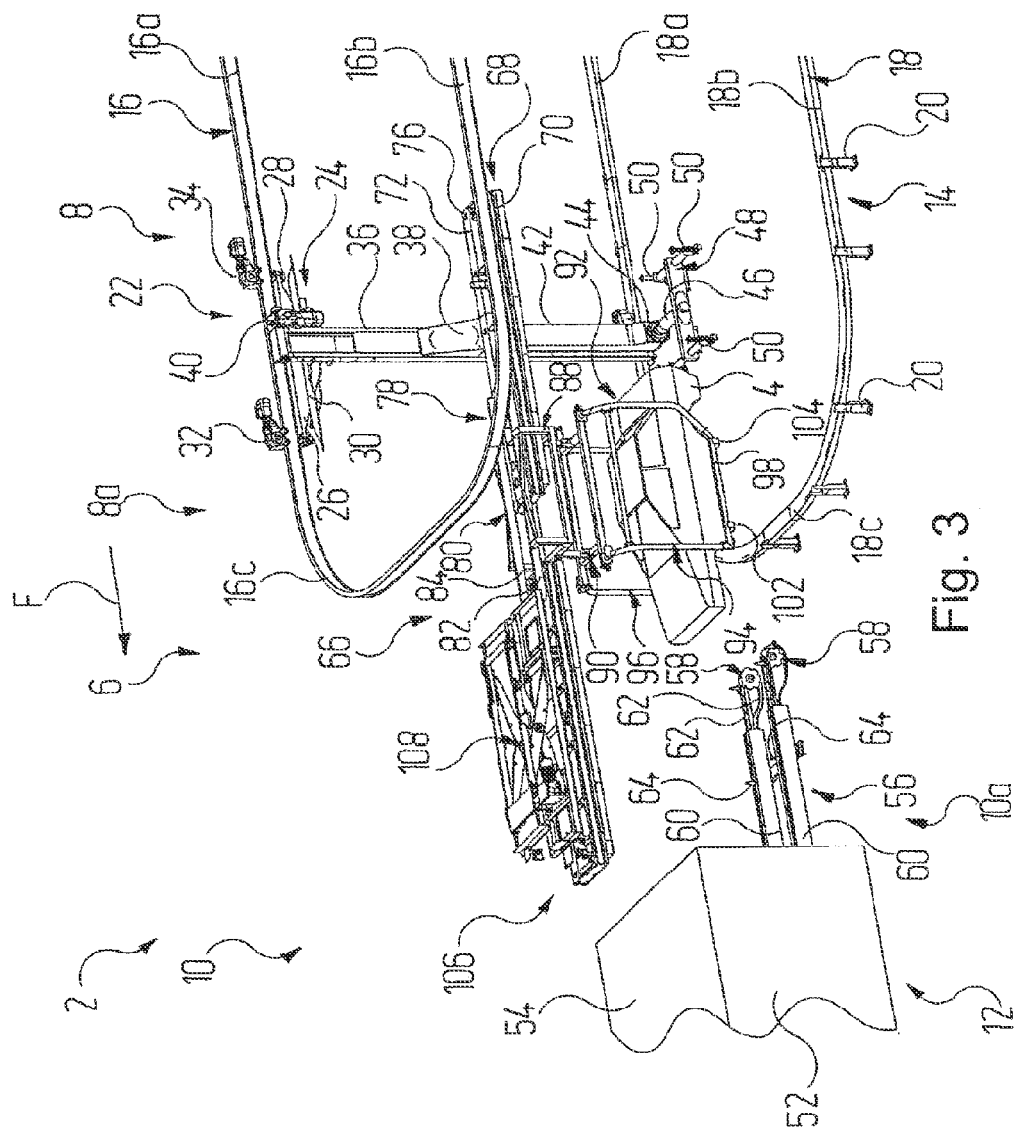
Figure 4:
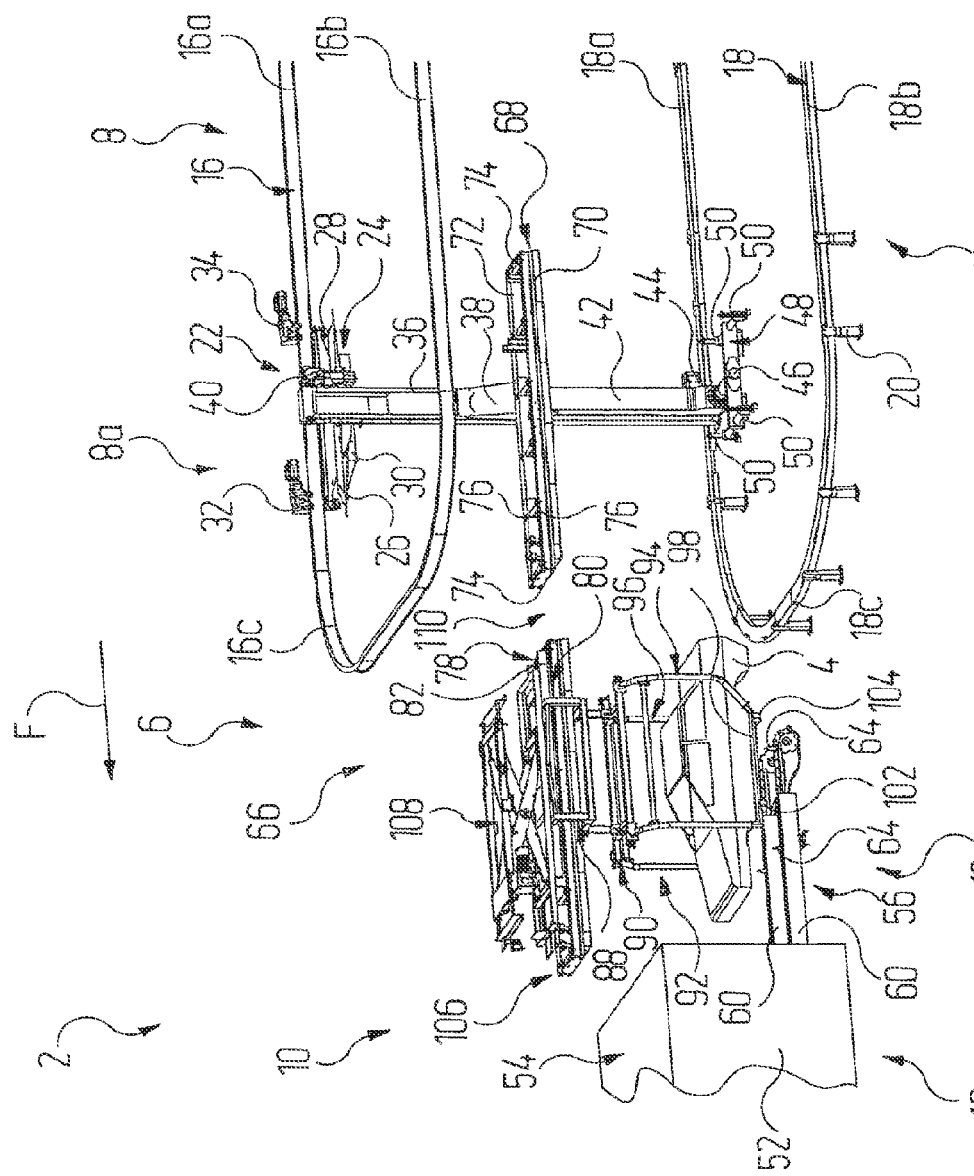

The displaceable roller conveyor 106 is brought into its upper working position by means of the lifting/lowering device 108, and power is supplied to the driven rollers 76 of the two roller conveyors 68, 106, so that the carriage 78 with the motor vehicle body 4 is moved in the conveying direction F from the stationary roller conveyor 68 onto the displaceable roller conveyor 106. In FIG. 3, the carriage 78 is shown moving from the stationary roller conveyor 68 onto the displaceable roller conveyor 106. As can be seen therein, the running bars 80, 82 of the carriage 78 of the transfer device 66 are sufficiently long that the gap 110 between the opposing ends of the two roller conveyors 68 and 106 can safely be bridged.

When the carriage 78 has moved completely onto the displaceable roller conveyor 106 (see FIG. 4), the carriage 78 is brought into a position in which the above-mentioned coupling components of the motor vehicle body 4 are each arranged above an associated upwardly projecting support pin 64 of the chain conveyor 56.

Figure 5:
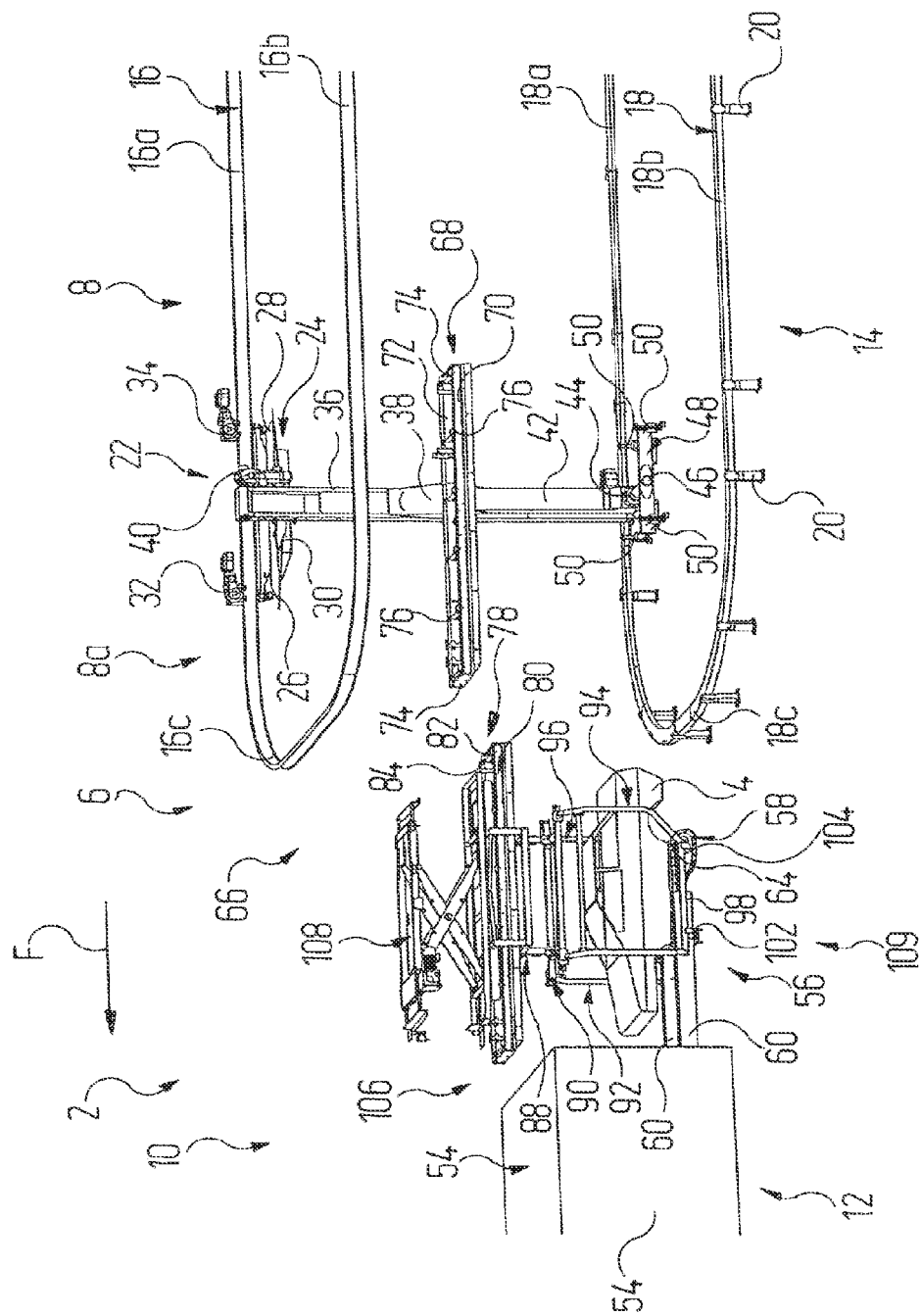

The lifting/lowering device 108 is then controlled in such a manner that the displaceable roller conveyor 106 together with the carriage 78 and the motor vehicle body 4 is lowered. During the downward movement, the support pins 64 engage into the associated coupling component of the motor vehicle body 4 and receive the motor vehicle body 4. The displaceable roller conveyor 106 is moved downwards further beyond that receiving position into a lower working position, so that the carrier brackets 102, 104 of the suspended conveyor 92 are released from the motor vehicle body 4 and the latter is finally resting solely on the chain conveyor 56. This is shown in FIG. 5.

The transfer of the motor vehicle body 4 can take place on the one hand while the chain conveyor 56 is stationary. On the other hand, however, the transfer can also be carried out while the chain conveyor 56 is running, to which end the carriage 78 moves synchronously with the rate of advance of the chain conveyor 56 and the motor vehicle body 4 is at the same time lowered. The motor vehicle body 4 is subsequently conveyed by means of the chain conveyor 56 into the drier housing 52, where the motor vehicle body 4 is dried. When the motor vehicle body 4 has been moved away from the suspended conveyor 92 in that manner, the displaceable roller conveyor 106 can be returned to its upper working position and the carriage 78 can be moved back onto the stationary roller conveyor 68 (see FIG. 1). The transfer operation can then be repeated with a further motor vehicle body 4, which comes from the cataphoretic dip coating in the dip treatment area 8.

While the carriage 78 is located on the displaceable roller conveyor 106, the transport carriage 22 of the overhead conveyor 14 can be moved between the roller conveyors 68, 106 to the section 16*b* of the drive rail 16 and thereby guided back to the dip tanks of the dip treatment area 8.

The vertical position of the suspended conveyor 92 and accordingly of the carrier brackets 102, 104 can be adjusted by means of the displaceable roller conveyor 106. In a modification, a lifting/lowering device can also be arranged between the carriage 78 and the suspended conveyor 92. In that case, the second roller conveyor 106 can likewise be stationary and unchangeable in terms of its height.

The transfer device 66 according to the first exemplary embodiment of FIGS. 1 to 5 is configured particularly for transfer between two conveyor systems in which the motor vehicle body 4 is conveyed in the same conveying direction F, without there being a change of direction or a lateral offset between the conveying directions of the two conveyor systems.

However, individual local circumstances may also require an arrangement of the two treatment areas 8 and 10 that are to be passed through in succession which requires a change in the conveying direction F of the motor vehicle body 4.

A second exemplary embodiment of a surface treatment plant 2 in which that is the case will now be described by means of FIGS. 6 to 21. In those figures, components which correspond to those of the first exemplary embodiment according to FIGS. 1 to 5 are provided with the same reference numerals, only the most important components being labelled.

The dip treatment area 8 and the drying area 10 are here not arranged one behind the other in the same conveying direction. Instead, the dip treatment area 8 and the drying area 10 are located next to one another, so that the motor vehicle bodies 4 are conveyed by means of the overhead conveyor 14 in a first conveying direction F1 through the dip treatment area 8 and by means of the chain conveyor 56 in an opposite, second conveying direction F2 through the drier 12. The conveying directions F1 and F2 are indicated by means of arrows only in FIGS. 6 and 7. The drier housing 52 extends next to the section 18*a* of the guide rail 18 of the overhead conveyor 14.

In order to permit a transfer between the overhead conveyor 14 as the first conveyor system and the chain conveyor 56 as the second conveyor system, there is present a transfer device 112 which allows movement of a motor vehicle body 4 perpendicularly to the conveying directions F1 and F2.

To that end, the transfer device 112 comprises as the carriage a sliding carrier 114, which runs on a pair of rails 116 which here serves as a carrier rail system and is attached to the floor. The pair of rails 116 is arranged between sections 18*a* and 18*b* of the guide rail 18 and extends perpendicular thereto. The pair of rails 116 extends beneath the guide rail 18, so that the sliding carrier 114 could in principle be moved so close to the guide rail 18 that it touches it. During operation, the sliding carrier 114 is moved to and fro between a forward operating position, in which it is moved close to the guide rail 18, and a rear operating position, in which it is at a distance from the guide rail 18. When the sliding carrier 114 occupies its rear operating position, the distance to the guide rail 18 is sufficiently great that there is space between the sliding carrier 114 and the guide rail 18 for the carrier unit 48 of the transport carriage 22 of the overhead conveyor 14. This can be seen, for example, in FIG. 6.

The sliding carrier 114 comprises a platform 118 which can be lifted and lowered in the vertical direction and which can be moved up and down between a lower working position and an upper working position. To that end, the sliding carrier 114 carries a lifting and lowering device (not shown in the figures) which can be in the form of, for example, an eccentric lift or a scissor lift, as is known per se.

The platform 118 in turn carries a horizontally extending carrier fork 120 with two parallel carrier prongs 122, 124, each of which forms an upper support surface 122*a*, 124*a*.

The vertical position of the carrier fork 120 and accordingly of the carrier prongs 122, 124 can be adjusted by means of the platform 118. In addition, the carrier fork 120 can be extended horizontally beyond the platform 118 in a direction towards the drying area 10 and retracted again, which direction is perpendicular to the conveying directions F1 and F2. As a result, the horizontal position of the carrier fork 120 relative to the sliding carrier 114 is adjustable.

The transfer of a motor vehicle body 4 from the overhead conveyor 14 of the dip treatment area 8 to the chain conveyor 56 of the drying area 10 is carried out by means of the transfer device 112 as follows. FIGS. 6, 9, 12, 15, 16 and 19 show five phases of the transfer in a perspective view, the first, second and third and also the fifth and sixth phases of which are shown in a top view in FIGS. 7, 10, 13, 17 and 20 and in a front view in FIGS. 8, 11, 14, 18 and 21.

Figure 6:
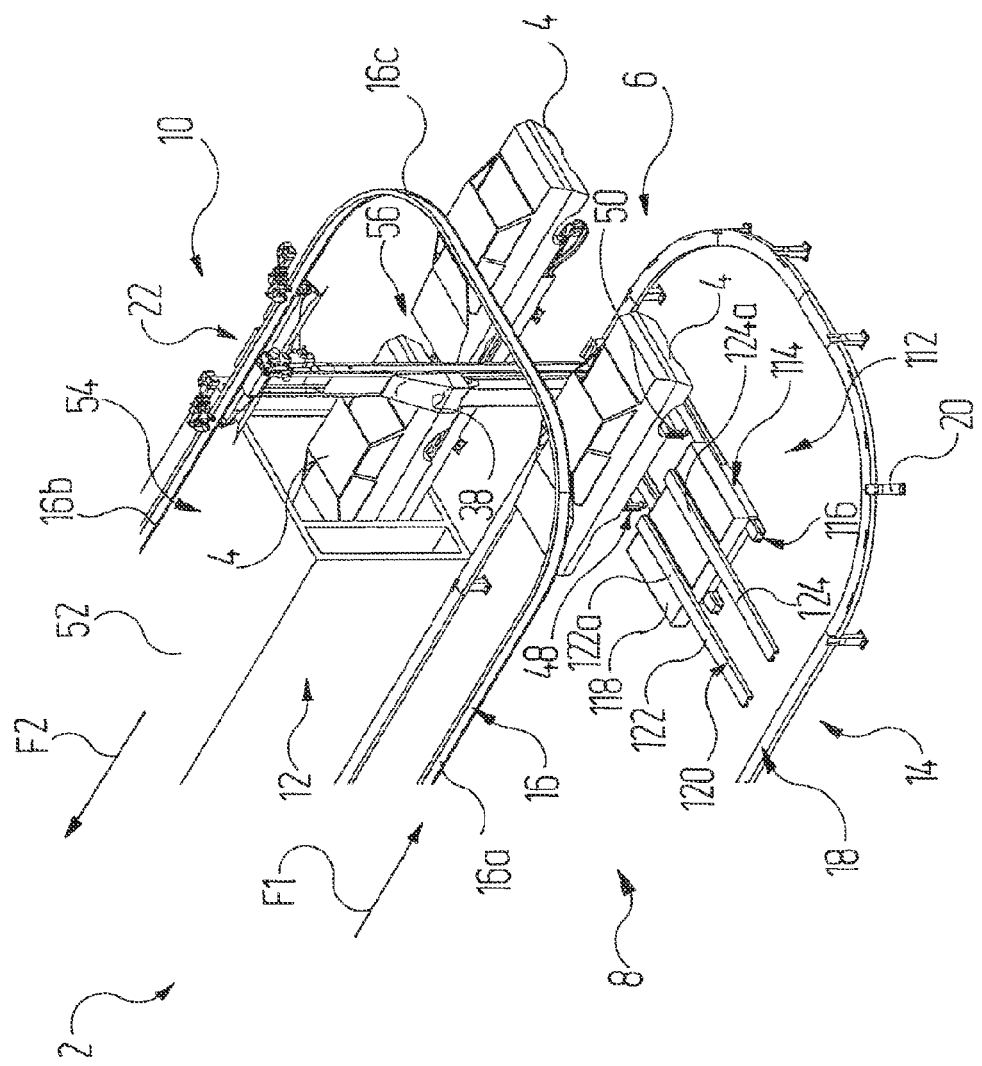

FIGS. 6, 7 and 8 show a starting situation in which the sliding carrier 114 occupies its rear operating position. In addition, the platform has been brought into its lower working position and the carrier fork 120 has been retracted so that the space between the sliding carrier 114 and the guide rail 18 is free. The chain conveyor 56 is already carrying motor vehicle bodies 4 that are to be dried.

In the phase shown in FIGS. 6 to 8, a motor vehicle body 4 coming from the dip tanks of the dip treatment area 8 by way of the rail section 16*a* is still fixedly secured by means of the locking pins 50 to the carrier unit 48 of the transport carriage 22 of the overhead conveyor 14. The transport carriage 22 of the overhead conveyor 14 has already been moved into a position in which the motor vehicle body 4 is arranged in front of the sliding carrier 114. To that end, the transport carriage coming from section 16*a* has already traversed the curved section 16*c* of the drive rail 16.

Owing to the extent of the locking pins 50, a space remains between the carrier unit 48 of the transport carriage 22 and the bottom of the motor vehicle body 4. The slide 38 of the transport carriage 22 and the platform 118 of the transfer device 112 are each brought to a level such that the carrier prongs 122, 124 of the carrier fork 120 can be introduced into the space between the carrier unit 48 and the motor vehicle body 4. The spacing of the carrier prongs 122, 124 of the carrier fork 120 is such that they can be introduced between the locking pins 50, and the support surfaces 122*a*, 124*a* come to be located beneath the above-mentioned bottom support regions of the motor vehicle body 4.

Figure 9:
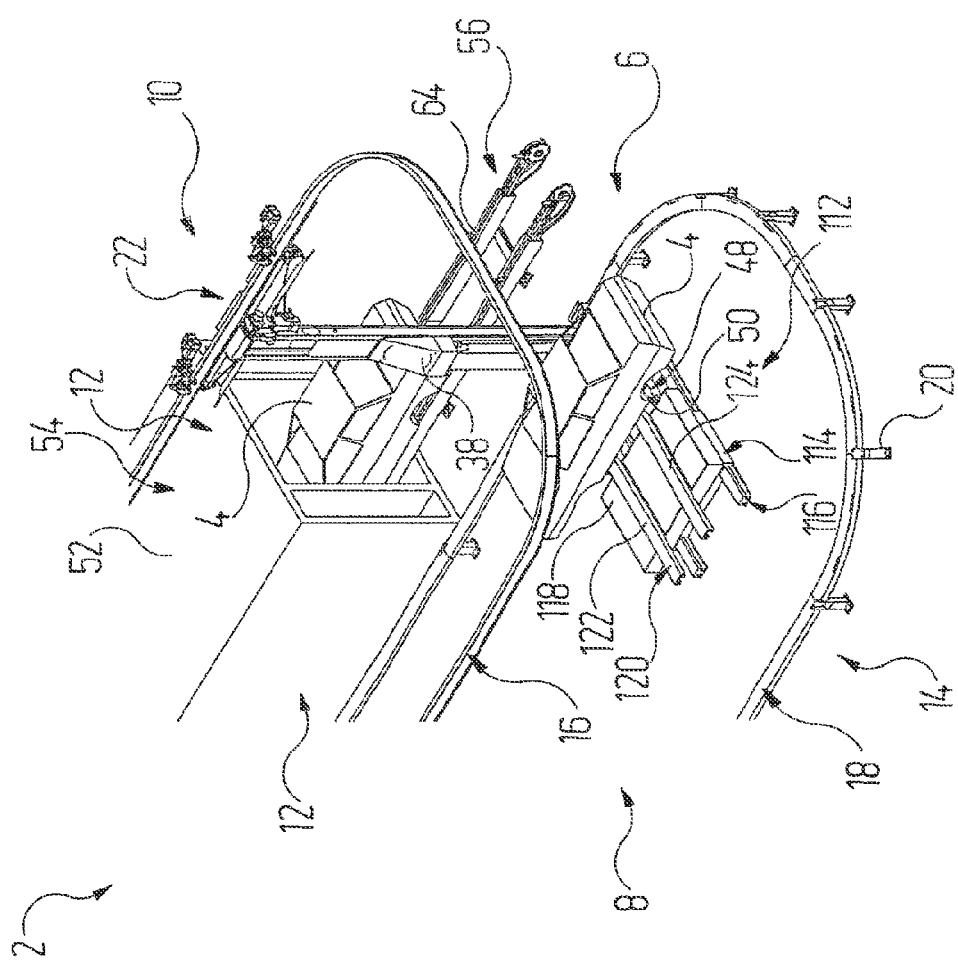

This is then carried out in a subsequent step, wherein the sliding carrier 114 of the transfer device 112 may also be moved slightly towards the motor vehicle body 4. The platform 118 of the transfer device 112 is then raised slightly until the support surfaces 122*a*, 124*a* of the carrier fork 120 are in contact with the bottom support regions of the motor vehicle body 4. This phase is shown in FIGS. 9 to 11. As can be seen therein, the motor vehicle bodies 4 on the chain conveyor 56 have in the meantime been moved in the conveying direction F2, so that the starting region of the chain conveyor 56 is now unoccupied and is free for a further motor vehicle body 4.

The locking pins 50 of the carrier unit 48 are released, and the slide 38 of the transport carriage 22 is moved downwards slightly so that the carrier unit 48 frees the motor vehicle body 4, which is then carried completely by the sliding carrier 114 of the transfer device 112.

Figure 12:
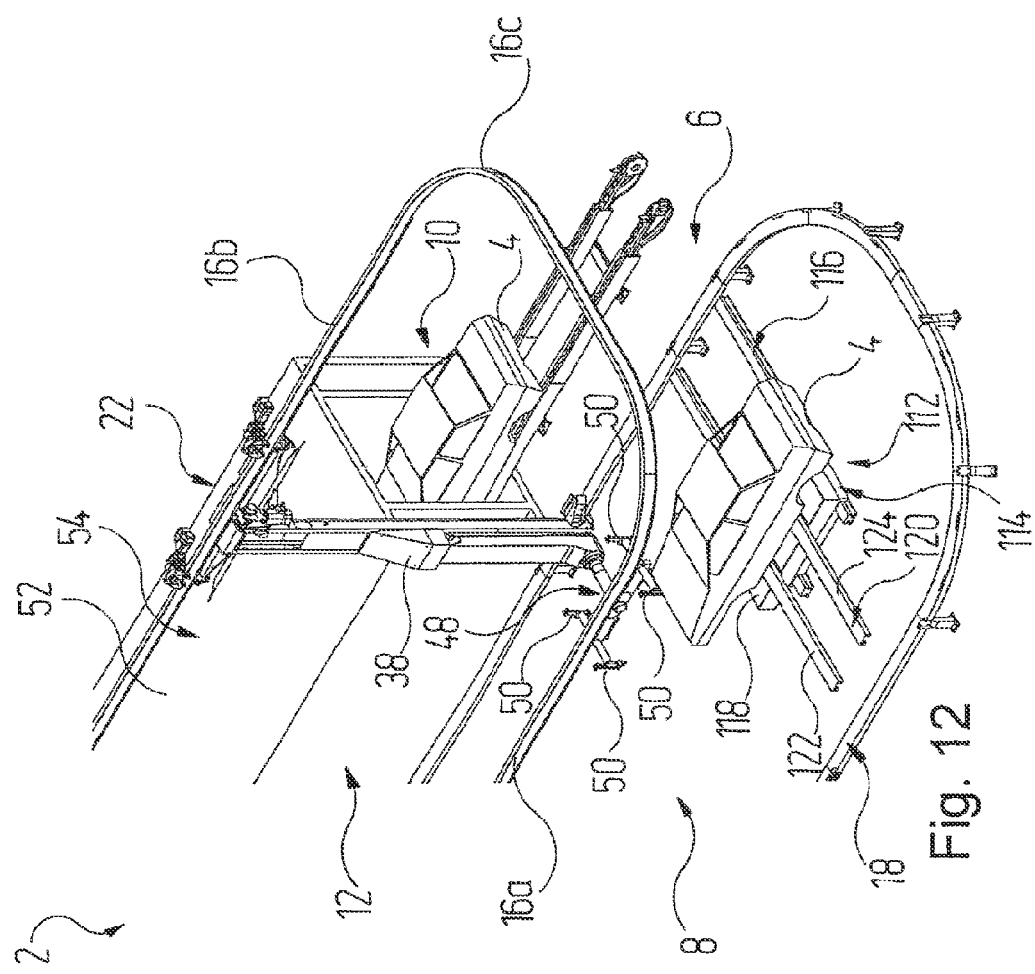

The carrier fork 120 of the transfer device 112 is then first retracted, so that the motor vehicle body 4 comes to be located over the platform 118. The transport carriage 22 of the overhead conveyor 14 can then be moved, for example, contrary to the conveying direction F1, so that the region in front of the sliding carrier 114 in the direction towards the drying area 10 becomes free. This phase of the transfer is shown in FIGS. 12 to 14. From there, the transport carriage 22 can be guided back to the dip tanks of the dip treatment area 8 by way of the rail section 16*b*.

Figure 16:
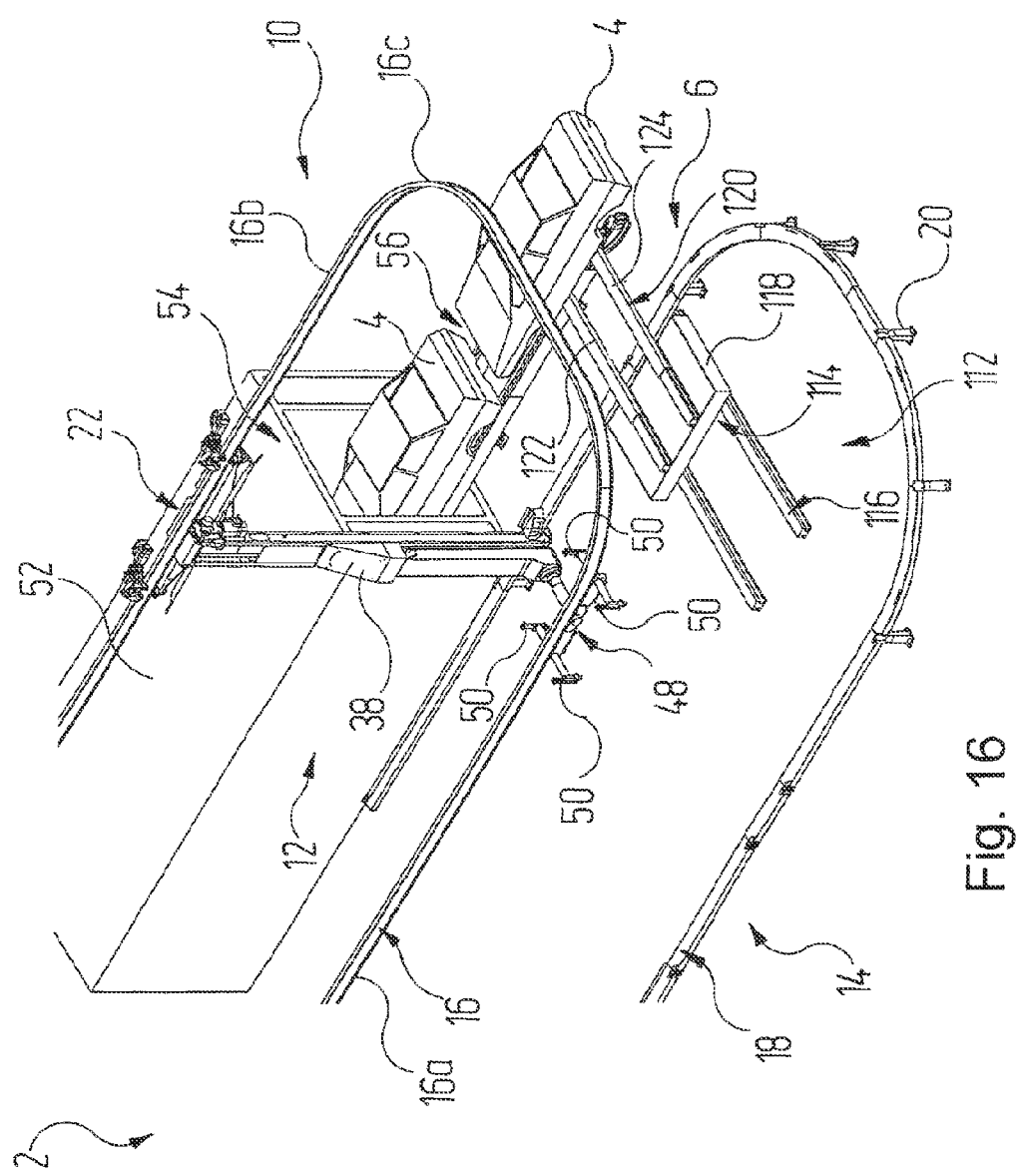

Then, in a coordinated movement, on the one hand the carrier fork 120 is extended fully beyond the platform 118 and on the other hand the sliding carrier 114 is moved into its forward operating position. The sliding carrier 114 accordingly occupies a transfer position, which is shown in FIGS. 16 to 18, an intermediate position shown in FIG. 15 being passed through.

In the transfer position of the sliding carrier 114, the motor vehicle body 4 occupies a position above the chain conveyor 56, in which its above-mentioned coupling components are each arranged above an associated upwardly projecting support pin 64 of the chain conveyor 56. To that end, the platform 118 of the sliding carrier 114 may have been raised slightly compared with its starting position.

The platform 118 together with the motor vehicle body 4 is then lowered, the support pins 64 of the chain conveyor 56 engaging into the respective associated coupling component of the motor vehicle body 4 and receiving the motor vehicle body 4. The support pins 64 are sufficiently long that the carrier prongs 122, 124 can move further downwards in the gap between the motor vehicle body 4 and the endless chains 58 of the chain conveyor, in order to free the motor vehicle body 4.

When this has taken place, the carrier fork 120 is retracted and the motor vehicle body 4 has been transferred to the chain conveyor 56. The motor vehicle body 4 is then conveyed by means of the chain conveyor 56 into the drier housing 52, where the motor vehicle body 4 is dried.

The displaceable and movable components of the transfer device 112 are returned to their starting positions shown in FIGS. 6 to 8, whereupon the transfer operation can be repeated with a different motor vehicle body 4 which comes from cataphoretic dip coating in the dip treatment area 8.

The transfer devices 66 and 112 discussed above as a first and second exemplary embodiment have been described with reference to a transfer region between a dip treatment area and a drying area, which corresponds to the treatment areas TA-1 and TA-2 discussed at the beginning. However, the transfer devices 66 and 112 can also be arranged in any other transfer region between successive treatment areas TA-(x) and TA-(x+1), in which a motor vehicle body must be transferred from a first conveyor system to a second conveyor system.

Also, the motor vehicle bodies 4 can not only be transferred from an overhead conveyor to a second conveyor system. A corresponding transfer from first conveyor systems which are structurally different and also different from one another to a second conveyor system is also possible.

According to the main idea of the invention discussed at the beginning, a motor vehicle body is to be conveyed without a skid as far as possible during its entire passage through the treatment plant 2. Following this main idea, the two conveyor systems 14 and 56 in the above-described treatment plant 2 have each been discussed by way of example as a variant in which the motor vehicle body 4 is not conveyed on a skid, as is generally conventional, but in each case is coupled directly to the corresponding conveyor system 14 or 56.

In a modification thereof, the transfer devices 66 and 112 can also be used to transfer motor vehicle bodies from a first conveyor system, in which the motor vehicle bodies are conveyed with a skid, to a second conveyor system, by means of which the motor vehicle bodies are transported without a skid. Accordingly, the transfer of a motor vehicle body by means of the transfer devices 66 or 112 can also take place from a first conveyor system, by means of which the motor vehicle bodies are transported without a skid, to a second conveyor system, in which the motor vehicle bodies are conveyed with a skid. In this manner, skids are not required at least in part-regions of the treatment plant, in particular, for example, in drying areas, so that no additional energy is given to the skids.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A surface treatment plant for motor vehicle bodies, comprising:
    a) a first treatment area which comprises a first conveyor system which is capable of conveying a motor vehicle body through the first treatment area;
    b) a second treatment area which comprises a second conveyor system which is capable of conveying the motor vehicle body through the second treatment area;
    c) a transfer device which for transferring the motor vehicle body from the first conveyor system to the second conveyor system and which comprises carrier means which engage with regions of the motor vehicle body, at least one carrier means being arranged at a lowermost point of the motor vehicle body, which is oriented horizontally and roof upwards,
    wherein the first conveyor system and/or second conveyor system are configured such that they convey the motor vehicle body without a separate carrier structure for the motor vehicle body, and the first conveyor system and/or second conveyor system comprise coupling elements which directly engage coupling components of the motor vehicle body,
    and further wherein the coupling elements of at least one of the first conveyor system or the second conveyor system comprise locking pins such that the motor vehicle body remains securely connected to a carrier unit of the vehicle body that can be rotated to any angle.

2. The plant according to claim 1, wherein the carrier means the transfer device are configured such that they cooperate with bottom regions of the motor vehicle body, which is oriented roof upwards, that are not used by the first conveyor system or by the second conveyor system.

3. The plant according to claim 1, wherein the transfer device comprises a carrier rail system and a carriage running thereon, which carriage carries the carrier means for the motor vehicle body.

4. The plant according to claim 3, wherein a vertical position of the carrier means is adjustable.

5. The plant according to claim 3, wherein the carrier rail system of the transfer device is a roller conveyor, and the carriage comprises a running gear complementary thereto.

6. The plant according to claim 5, wherein the roller conveyor is arranged at a distance from a floor, and the running gear is coupled to a suspended conveyor which in turn comprises the carrier means for the motor vehicle body.

7. The plant according to claim 6, wherein at least a section of the roller conveyor is displaceable by a lifting/lowering device between an upper working position and a lower working position.

8. The plant according to claim 3, wherein the carrier rail system of the transfer device is a floor-mounted rail system, and the carriage is a sliding carrier running thereon.

9. The plant according to claim 8, wherein the sliding carrier carries a lifting/lowering device which adjusts a vertical position of the carrier means.

10. The plant according to claim 8, wherein a horizontal position of the carrier means relative to the sliding carrier is adjustable.

11. The plant according to claim 8, wherein the carrier means comprise a fork element having at least two carrier prongs.

12. A method for conveying motor vehicle bodies through a surface treatment plant, in which a motor vehicle body is conveyed by a first conveyor system through a first treatment area and by a second conveyor system through a second treatment area, the method comprising the steps of:
- transferring the motor vehicle body with a transfer device from the first conveyor system to the second conveyor system;
- wherein carrier means of the transfer device engage with regions of the motor vehicle body, at least one region being arranged at a lowermost point of the motor vehicle body, which is oriented horizontally and roof upwards, and the motor vehicle body is conveyed by means of the first conveyor system and/or by means of the second conveyor system without a separate carrier structure for the motor vehicle body, and the first conveyor system and/or second conveyor system comprise coupling elements which directly engage coupling components of the motor vehicle body,
- and further wherein the coupling elements of at least one of the first conveyor system or the second conveyor system comprise locking pins such that the motor vehicle body remains securely connected to a carrier unit of the vehicle body that can be rotated to any angle.

13. The method according to claim 12, wherein the carrier means of the transfer device engage with bottom regions of the motor vehicle body, which is oriented horizontally and roof upwards, that are not used by the first conveyor system or by the second conveyor system.

14. A surface treatment plant for motor vehicle bodies, comprising:
- a) a first treatment area which comprises a first conveyor system which is capable of conveying a motor vehicle body through the first treatment area;
- b) a second treatment area which comprises a second conveyor system which is capable of conveying the motor vehicle body through the second treatment area:
- c) a transfer device which is capable of transferring the motor vehicle body from the first conveyor system to the second conveyor system and which comprises carrier means which engage with regions of the motor vehicle body, at least one carrier means being arranged at a lowermost point of the motor vehicle body, which is oriented horizontally and roof upwards,
- wherein the first conveyor system and/or second conveyor system comprise coupling elements which directly cooperate with coupling components formed as part of the motor vehicle body,
- and further wherein the coupling elements of at least one of the first conveyor system or the second conveyor system comprise locking pins such that the motor vehicle body remains securely connected to a carrier unit of the vehicle body that can be rotated to any angle.

15. The surface treatment plant according to claim 14 wherein the coupling components formed as part of the motor vehicle body are apertures formed in the motor vehicle body.

* * * * *